UNITED STATES PATENT OFFICE.

CHARLES M. MAPES, OF NEW YORK, N. Y.

FLUID-PROOFED HOLLOW OBJECT AND PROCESS FOR MAKING HOLLOW OBJECTS FLUID-PROOF.

1,219,021.   Specification of Letters Patent.   Patented Mar. 13, 1917.

No Drawing.   Application filed July 1, 1916.   Serial No. 107,186.

*To all whom it may concern:*

Be it known that I, CHARLES M. MAPES, of New York, in the county of New York, and in the State of New York, have invented a certain new and useful Improvement in Fluid-Proofed Hollow Objects and Processes for Making Hollow Objects Fluid-Proof, and do declare that the following is a full, clear, and exact description thereof.

My invention relates to a fluid-proofed, hollow object and process for making hollow objects fluid-proof, such as concrete pipes or other articles of hollow concrete, either reinforced or not reinforced; and has for its object to provide a fluid-proof structure convenient and inexpensive to manufacture, which will not leak when subjected to pressure.

Although my invention is not limited thereto, it will be described for purposes of illustration in connection with a reinforced concrete pipe designed to convey water under pressure.

A satisfactory pipe to convey water under pressure long has been desired. Such a pipe must be able to withstand high internal pressure, must not leak when subjected to such pressure, and must be inexpensive and convenient to manufacture.

A metal pipe of sufficient strength to withstand the necessary pressure without leakage, is too expensive for many purposes. A concrete pipe is inexpensive and convenient to manufacture, but it will not stand a high internal pressure unless its walls are so thick that its cost and bulk are prohibitive.

A pipe constructed of metal and of concrete, such as a reinforced concrete pipe, partially fulfils the necessary conditions, but it has not been possible heretofore to construct an economical and practical reinforced concrete pipe which will withstand high internal pressure without leakage. If enough reinforcement is used to prevent any expansion of the pipe under the internal pressure to which it will be subjected in use, the cost still is too high for many purposes. If the amount of reinforcement used is reduced, so that the reinforcing members will stretch under use and the increasing resistance to stretch of the reinforcing members is utilized to withstand the said internal pressure, the concrete will crack, as its elastic limit is so low compared with that of the reinforcing members, that the elastic limit of the concrete will be exceeded long before the predetermined internal pressure is reached for which the pipe is designed, although said internal pressure is less than the reinforcing members are designed to carry without reaching their elastic limit. The leakage caused by these cracks in the concrete cannot be obviated merely by treating the inner surface of the pipe with a water-proof coating, or by filling the voids in the pipe with a water-repellent material as in the integral system of waterproofing, for as soon as the elastic limit of the concrete is exceeded under conditions of use, leakage cracks will develop, irrespective of these treating methods.

My process consists in filling the voids and cracks in the pipe, while the pipe is subjected to a predetermined internal pressure which is at least equal to the pressure to which the pipe will be subjected under conditions of use. The cost of such a pipe is sufficiently low for ordinary purposes, as the amount of reinforcement can be reduced to such an extent that its elastic limit will be reached at a degree of pressure exceeding the predetermined internal pressure only by such factor of safety as standard engineering practice deems sufficient. In other words, the increasing resistance of the reinforcing members to stretch can be utilized to the utmost in designing the amount of reinforcement necessary for the particular work in hand, and to a much greater degree than is possible if my process of waterproofing is not utilized. The concrete shell likewise can be comparatively thin, as cracks developed by the internal pressure are filled, and the pipe thus made leak-proof, before the pipe is put into use.

More specifically, the embodiment of my invention chosen for purposes of illustration consists in stressing the reinforcing members to an extent at least equal to the maximum stress to which the pipe will be subjected under predetermined conditions of use. As the elastic limit of the concrete will have been exceeded, cracks will develop therein, which are filled, together with any voids in the concrete, with a water-proofing material which takes its permanent set while the stressed condition is maintained, so that when the stressing means are removed, the reinforcing members will maintain their stressed condition. It is evident that when internal hydrostatic pressure occurs in the pipe thereafter, there will be no expansion of the pipe until that degree of internal pressure originally applied in obtaining the stressed condition is exceeded. As all the voids in the pipe are completely filled, and no cracking is induced, the pipe is absolutely water-proof up to the degree of internal pressure for which it was designed. In order to make clear the lack of expansion in the pipe until the degree of internal pressure originally applied is exceeded, the following simple test is suggested:

Place a rubber band around a split wooden ring and move the pieces outward with a pressure of 5 pounds, thereby stretching the elastic band. The two pieces of wood then should be blocked against inward movement to maintain the elastic band in its stretched condition. It is evident that the elastic band is exerting a compression stress on the ring sections of at least 5 pounds tending to force the blocks together. In order to move the blocks farther apart, therefore, it will be necessary to utilize a pressure thereon exceeding 5 pounds before any further outward movement of the pieces of wood can be obtained. The effect on the reinforcing of the concrete pipe is exactly the same. If the pipe be expanded under a pressure of 200 pounds per square inch and maintained in that stressed position by filling the voids, induced or otherwise, with a material which takes its permanent set while the stress is maintained, the reinforcing members are exerting an inward pressure equivalent to 200 pounds to the square inch. Before any further elongation of the reinforcing members is possible, an internal pressure of at least more than 200 pounds to the square inch must be reached.

The water-repellent material used to fill the voids may be chosen with respect to the fluid which the pipe will contain. Thus if acids are to be carried, the material will be such as acids will not affect. For general convenience of treatment, a substance which can be applied as a liquid and which will harden or solidify after application, is desirable. Substances which are liquid when heated and which solidify at ordinary temperatures may be used conveniently. Thus, a resinate will furnish a satisfactory treating liquid for concrete water or sewer pipes, although the invention is not limited to the use of a resinate.

One method for carrying out my process consists in filling the interior of a pipe with a heated resinate and applying pressure thereto sufficient to induce the desired stress on the reinforcing members. The induced and other cracks and voids thus are filled completely with the resinate. Compressed air then is introduced in such a manner as to force the resinate from the interior of the pipe but to maintain the desired pressure on the interior of the pipe, which then is allowed to cool. If desired, the outside of the pipe may be incased in a temporary mold or form so that if large cracks are induced, the air will not force the resinate out of the cracks while the resinate is acquiring its permanent set. The stressing of the reinforcing members may be obtained in any desired manner, either hydraulic or mechanical. The pipe also may be given any desired preliminary treatment to improve the quality of the concrete.

Many modifications will be apparent to those skilled in the art, my invention not being limited to the particular embodiment chosen to illustrate the same, but comprising a fluid-proofed, hollow object and process for making hollow objects fluid-proof, which consists in expanding the object by a force at least equal to the maximum force to which the object will be subjected under predetermined conditions of use and maintaining the stressed condition by filling permanently voids in the walls of the object, with a fluid-repellent material. It is evident, for example, that a reinforced pipe composed of sections, of blocks, or provided with a flexible joint, may be utilized, in which case cracks in the body of the concrete segments would not be induced, the capability of the segments to move apart permitting the expansion necessary to arrive at the stressed condition of the reinforcement desired.

Having described my invention, what I claim and desire to protect by Letters Patent of the United States is as follows:

1. The process of making hollow objects fluid-proof which consists in subjecting said objects to a degree of force at least equal to the maximum force to which the objects will be subjected under predetermined conditions of use, and maintaining the stressed condition by filling permanently voids in the walls of the objects with a fluid-repellent material.

2. The process of making hollow objects fluid-proof which consists in subjecting said objects to pressure at least equal to the maximum pressure to which the objects will be subjected under predetermined conditions of use, and maintaining the stressed condition by filling permanently voids in the walls of the objects with a fluid-repellent material.

3. The process of making hollow objects fluid-proof which consists in subjecting said objects to pressure at least equal to the maximum pressure to which the objects will be subjected under predetermined conditions of use, and maintaining the stressed condition by forcing a fluid-repellent material into voids in the walls of the objects to remain therein permanently.

4. The process of making hollow objects fluid-proof which consists in subjecting said objects to pressure from a fluid-repellent material at least equal to the maximum pressure to which the objects will be subjected under predetermined conditions of use, and maintaining the stressed condition by permitting the fluid-repellent material to remain permanently in the voids in the walls of the objects.

5. The process of making hollow objects fluid-proof which consists in subjecting said objects to pressure at least equal to the maximum pressure to which the objects will be subjected under predetermined conditions of use, and maintaining the stressed condition by filling permanently the voids in the walls of the objects with a heated fluid-repellent material which solidifies at ordinary temperatures.

6. The process of making hollow objects fluid-proof which consists in subjecting the objects to pressure from a heated fluid-repellent material which solidifies at ordinary temperatures, said pressure to equal at least the maximum pressure to which the objects will be subjected under predetermined conditions of use, and maintaining the stressed condition by permitting the fluid-repellent material to solidify in the voids in the walls of the hollow object.

7. The process of making reinforced hollow objects fluid-proof which consists in stressing the reinforcing members of the hollow objects to an extent at least equal to the maximum stress to which they will be subjected under predetermined conditions of use, and maintaining the stressed condition by filling permanently with a fluid-repellent material the voids in the walls of the hollow objects.

8. The process of making reinforced, hollow objects fluid-proof, which consists in stressing the reinforcing members of the hollow objects to an extent at least equal to the maximum stress to which they will be subjected under predetermined conditions of use, and maintaining the stressed condition by forcing a fluid-repellent material into the voids in the walls of the objects to remain therein permanently.

9. The process of making reinforced, hollow objects fluid-proof which consists in stressing the reinforcing members in the interior of the walls of the hollow object to an extent at least equal to the maximum stress to which they will be subjected under predetermined conditions of use, and maintaining the stressed condition by filling permanently with a fluid-repellent material the voids in the walls of the hollow object.

10. The process of making reinforced, hollow objects fluid-proof which consists in stressing the reinforcing members of the hollow objects by pressure to an extent at least equal to the maximum stress to which they will be subjected under predetermined conditions of use, and maintaining the stressed condition by filling permanently with a fluid-repellent material the voids in the walls of the hollow objects.

11. The process of making reinforced, hollow objects fluid-proof which consists in stressing the reinforcing members of the hollow objects by pressure from a heated fluid-repellent material which solidifies at ordinary temperatures, such pressure to be equal at least to the maximum pressure to which the objects will be subjected under predetermined conditions of use, and maintaining the stressed condition by permitting the fluid-repellent material to solidify in the voids in the walls of the hollow objects.

12. The process of making reinforced, hollow objects fluid-proof which consists in expanding the hollow objects to an extent which brings a stress upon their reinforcing members at least equal to the maximum stress to which they will be subjected under predetermined conditions of use, and maintaining the stressed condition by filling permanently voids in the walls of the objects with a fluid-repellent material.

13. The process of making hollow objects fluid-proof which consists in subjecting said objects to pressure from a heated fluid-repellent material at least equal to the maximum pressure to which the objects will be subjected under predetermined conditions of use, and maintaining the stressed condition by compressed air until the fluid-repellant material has taken its permanent set.

14. The process of making hollow objects fluid-proof which consists in subjecting said objects to pressure from a heated resinate at least equal to the maximum pressure to which the objects will be subjected under predetermined conditions of use, and maintaining the stressed condition by compressed air until the resinate has taken its permanent set.

15. The process of making circumferentially reinforced pipes fluid-proof under designed internal pressure, which consists in expanding said pipes to an extent which brings a stress upon their reinforcing members at least equal to that which will be induced by their designed internal pressure, and maintaining the expanded condition by filling permanently voids in the walls of said pipes with a fluid-repellent material.

16. The process of making circumferentially reinforced segmental pipes fluid-proof under designed internal pressure, which consists in expanding said pipes to an extent which brings a stress upon their reinforcing members at least equal to that which will be induced by their designed internal pressure, and maintaining the expanded condition by filling permanently voids in the walls of said pipes with a fluid-repellent material.

17. The process of making circumferentially reinforced concrete pipes fluid-proof which consists in utilizing reinforcing members of such strength as will enable them to stretch when subjected to pressure under predetermined conditions of use, and such an amount of concrete as will crack when subjected to pressure under predetermined conditions of use, subjecting said pipe to internal pressure at least equal to pressure under predetermined conditions of use and maintaining the expanded condition by filling permanently the cracks and voids in the concrete while so expanded.

18. As an article of manufacture, a hollow object maintained in stressed condition by a fluid-repellent material which fills voids in its walls.

19. As an article of manufacture, a reinforced hollow object maintained in stressed condition by a fluid-repellent material which fills voids in its walls.

20. As an article of manufacture, a hollow object maintained in stressed condition by a resinate which fills voids in its walls.

21. As an article of manufacture, a reinforced hollow object having its reinforcing members maintained in stressed condition by a fluid-repellent material which fills voids in its walls.

22. As an article of manufacture, a reinforced, hollow object having its reinforcing members stressed to an extent at least equal to the maximum stress to which they will be subjected under predetermined conditions of use and maintained in stressed condition by a fluid-repellent material which fills voids in its walls.

23. As an article of manufacture, a segmental, circumferentially reinforced concrete pipe having its reinforcing members maintained in stressed condition by a fluid-repellent material which fills voids in its walls.

24. As an article of manufacture, a circumferentially reinforced concrete pipe having reinforcing members of such strength as would enable them to stretch when subjected to pressure under predetermined conditions of use, and such an amount of concrete as would crack when subjected to pressure under predetermined conditions of use, with the reinforcing member stretched to an extent at least equal to the amount to which they would be stretched under conditions of use and maintained in such stretched condition by fluid-repellent material permanently set in cracks and voids in the concrete.

In testimony that I claim the foregoing I have hereunto set my hand.

CHARLES M. MAPES.

Witness:
Agnes F. McLaughlin.